United States Patent
Poh et al.

(10) Patent No.: US 9,494,747 B2
(45) Date of Patent: Nov. 15, 2016

(54) WINDOW OF OPTICAL WAVEGUIDE

(71) Applicant: HEWLETT-PACKARD DEVELOPMENT COMPANY, L.P., Houston, TX (US)

(72) Inventors: Kian Teck Poh, Singapore (SG); Jing Kai Tan, Singapore (SG); Chee How Lee, Singapore (SG)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/439,442

(22) PCT Filed: Jul. 16, 2013

(86) PCT No.: PCT/US2013/050743
§ 371 (c)(1),
(2) Date: Apr. 29, 2015

(87) PCT Pub. No.: WO2014/084920
PCT Pub. Date: Jun. 5, 2014

(65) Prior Publication Data
US 2015/0378115 A1 Dec. 31, 2015

(51) Int. Cl.
*G02B 6/42* (2006.01)
*G02B 6/28* (2006.01)
*G02B 6/43* (2006.01)

(52) U.S. Cl.
CPC ............ *G02B 6/4214* (2013.01); *G02B 6/2817* (2013.01); *G02B 6/4266* (2013.01); *G02B 6/43* (2013.01)

(58) Field of Classification Search
CPC . G02B 6/4214; G02B 6/2817; G02B 6/4266
See application file for complete search history.

(56) References Cited

U.S. PATENT DOCUMENTS

| 5,347,988 | A | 9/1994 | Hori |
| 5,653,519 | A | 8/1997 | Dobbs |
| 5,904,870 | A | 5/1999 | Fenner et al. |
| 2003/0089702 | A1 | 5/2003 | Carver et al. |
| 2006/0262324 | A1 | 11/2006 | Hays et al. |
| 2007/0230866 | A1 | 10/2007 | Daiber |
| 2010/0284662 | A1 | 11/2010 | Reagan et al. |
| 2012/0036303 | A1 | 2/2012 | Lee et al. |

FOREIGN PATENT DOCUMENTS

| JP | 9211266 A | 8/1997 |
| KR | 2001-0079835 A | 8/2001 |

OTHER PUBLICATIONS

Bockstaele, R. et al., A Scalable Parallel Optical Interconnect Family, Apr. 2004, IEEE, IO Overview Paper, vol. 5453, pp. 124-133.
English translation (machine-generated) of Abstract from Japanese Patent Publication No. 9211266A [retrieved on Apr. 29, 2015], Retrieved from the Internet: <http://worldwide.espacenet.com/publicationDetails/biblio?CC=JP&NR=H09211266A&KC=A&FT=D&ND=3&date=19970815&DB=worldwide.espacenet.com&locale=en_EP>, 2 pages.
English translation (machine-generated) of Abstract from Korean Patent Publication No. 20010079835A [retrieved on Apr. 29, 2015], Retrieved from the Internet: <http://engpat.kipris.or.kr/engpat/biblioa.do?method=biblioFrame>, 2 pages.
International Search Report and Written Opinion, Sep. 27, 2013, PCT Patent Application No. PCT/US2013/050743, 12 pages.

*Primary Examiner* — Jerry Rahll
(74) *Attorney, Agent, or Firm* — Hewlett Packard Enterprise Patent Department

(57) ABSTRACT

An optical waveguide has a window for receiving optical signals re-directed by a beam splitter and a heating element associated with the window.

3 Claims, 4 Drawing Sheets

WINDOW OF OPTICAL WAVEGUIDE

PRIORITY

The present application claims priority to PCT application number PCT/US2012/067071, having an international filing date of Nov. 29, 2012, which is incorporated by reference in its entirety.

BACKGROUND

Optical backplanes have been proposed for computing equipment in place of conventional electronic backplanes. The idea is that the optical backplane will pass signals in optical form between the blades which perform networking, server, storage or other functions. Typically the blades have processors which process electronic signals.

BRIEF DESCRIPTION OF THE DRAWINGS

Examples of the invention will now be described, by way of non-limiting example only, with reference to the accompanying drawings, in which.

DETAILED DESCRIPTION

The present application proposes an optical waveguide comprising a waveguide body to direct optical signals, a beam splitter to re-direct a portion of an optical signal out of the waveguide, and a window positioned to receive optical signals redirected by the beam splitter and to allow said redirected optical signals to leave the waveguide. The window is associated with a heating element. The heating element may be heated to prevent or remove condensation from the window, which might otherwise disrupt the passage of optical signals into and/or out of the waveguide.

Computing equipment such as a networking device (e.g. switch or router), server or storage device may utilize an optical backplane to carry signals in optical form between a number of blades which connect with the backplane. The blades typically have a processor with computing functionality (e.g. they may be server blades, network cards, storage devices etc) and each blade interfaces with the optical backplane. The optical backplane typically comprises one or more optical waveguides.

Figure 1:
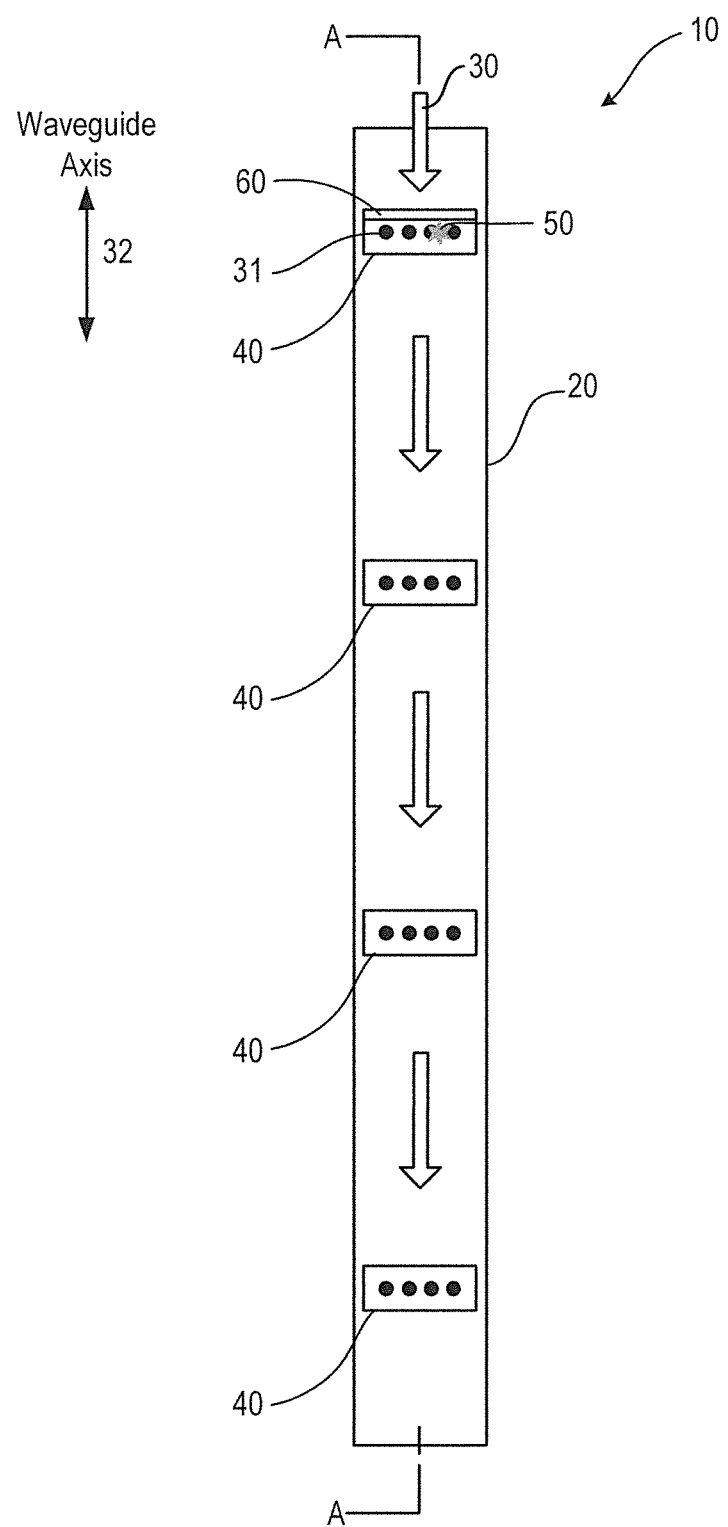
FIG. 1 shows an example of an optical waveguide as seen from the front.

FIG. 1 shows an example of an optical waveguide 10 as seen from the front. The waveguide comprises a waveguide body 20 that directs optical signals along the waveguide as shown schematically by the arrows 30. In one example the waveguide body may be a hollow metal waveguide (HMWG) comprising a metal body with a hollow interior. In the case of a HMWG, optical signals are reflected off the internal walls and thus directed down the air interface of the hollow interior. In alternative examples, other types of waveguide, such as a plastic or glass waveguide or a non-hollow waveguide comprising a core and cladding layer, could be used instead.

Figure 3:
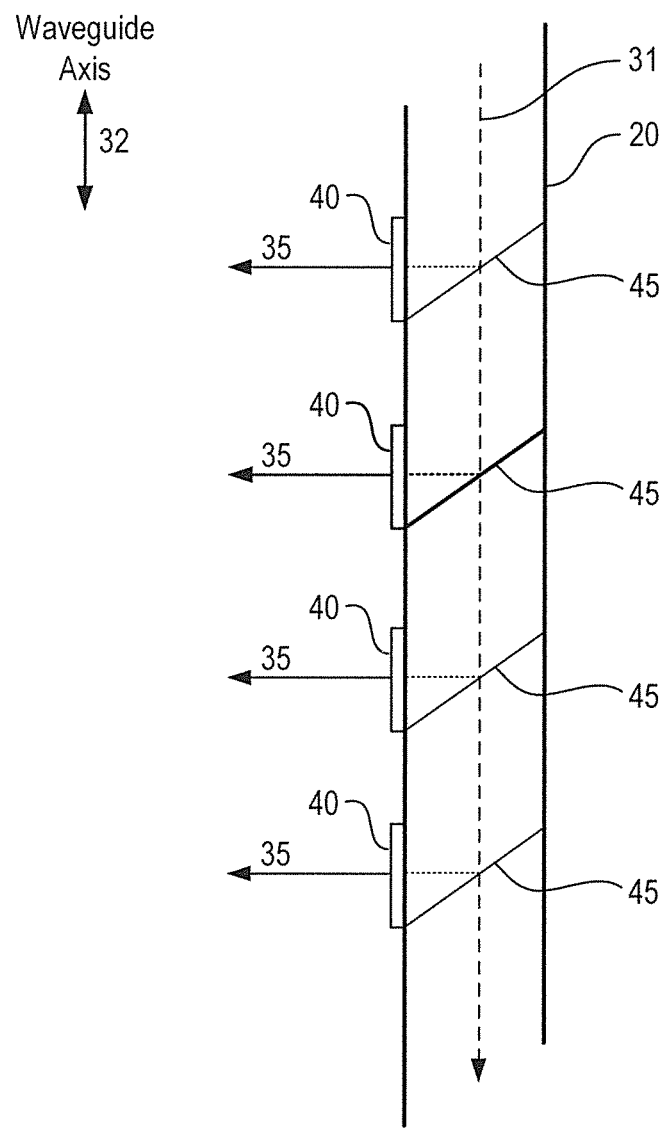
FIG. 3 shows a schematic example of a cross section of a waveguide along the line A-A of FIG. 1.

As shown in FIG. 1, the waveguide has at least one window 40 through which light may leave the waveguide. FIG. 1 shows a waveguide with four windows, but it is to be understood this is an example only and the waveguide may have any number of windows. Each window 40 comprises a block of transparent material through which the optical signal may pass. Each window is typically located in front of a beam splitter 45 (not shown in FIG. 1, but visible in FIG. 3). As shown in FIG. 3, a portion of an optical signal 31 travelling down the waveguide may be redirected 35 through a window 40 out of the waveguide by a beam splitter 45. The beam splitter 45 may for example be a pellicle beam splitter.

Due to low ambient temperature, or other reasons, condensation (e.g. small water droplets 50), may gather on an external surface of the window 40. This can obscure the window and disrupt the passage of optical signals into and out of the window. For example instead of being redirected in direction 35, the condensation may cause optical dispersion 36 resulting in weakening of the optical signal. Therefore, as will be discussed in more detail below, each window has an associated heating element 60 to heat the window so as to remove or prevent condensation.

Figure 2:
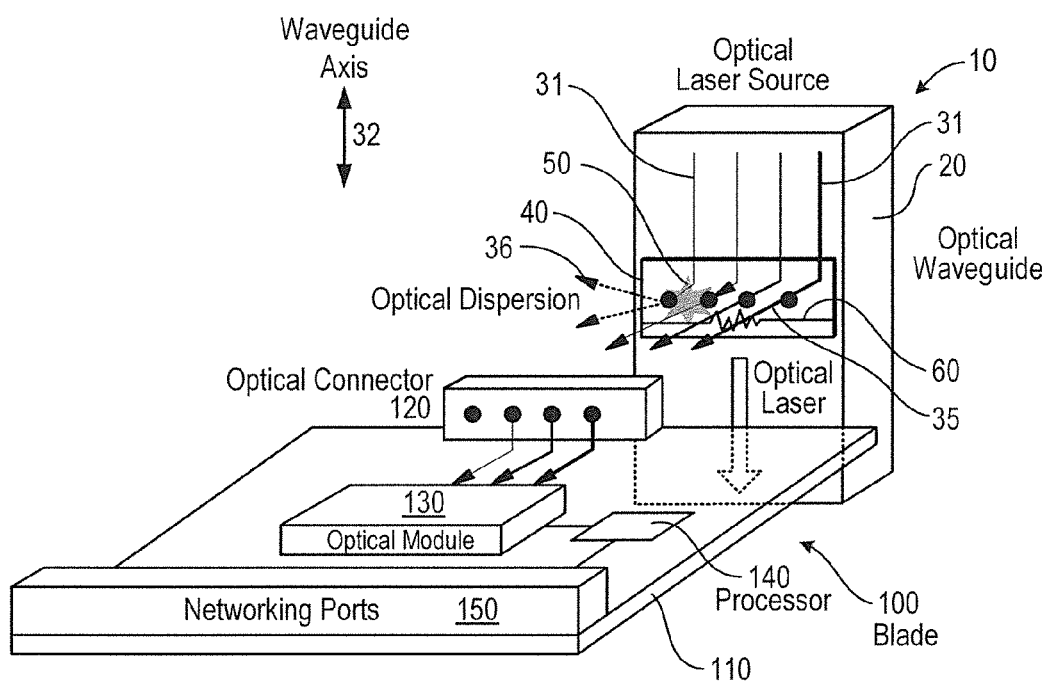
FIG. 2 shows an example of a portion of an optical waveguide which interfaces with a blade.

The waveguide 10 may have one channel or plural channels, each channel being configured to carrying a respective optical signal. For example, the channels may be physically constructed as separate grooves or passages in the waveguide body 20. Each channel may have internal walls that internally reflect optical signals to direct them down the channel. FIGS. 1 and 2 show four optical signals 31 each corresponding to a separate channel. To minimize the number of parts and constructions costs, a window 40 may cover all the channels, as in FIGS. 1 and 2. Alternatively there may be a separate window for each channel or each window may cover a subset of the channels.

FIG. 2 shows how a portion of the waveguide 10 may interface with a blade 100. As in FIG. 1, the waveguide 10 has a window 40 through which optical signals may enter or leave the waveguide. In the illustrated example, the optical signals 31 leave the waveguide in a direction 35 very approximately at right angles to the longitudinal axis 32 of the waveguide. The longitudinal axis 32 of the waveguide is in the general direction in which optical signals travel along the waveguide.

The blade may for example be a server blade, storage device or networking device (such as a switch or router). The blade comprises a board 110 on which components are mounted and a processor 140 which may be a dedicated chip (e.g. ASIC) or CPU having computing functionality for instance to process data, to route signals or control storage of data. The processor 140 typically receives and processes electronic signals. The blade may comprise a networking port module 150 connected to the processor for connecting the blade to other electronic equipment; e.g. the module 150 may comprise RJ45 ports.

The blade comprises an optical connector 120 to receive optical signals and direct them to an optical module 130. The optical module 130 converts the optical signals to electronic signals and forwards the electronic signals to one or more other components of the blade, such as the processor 140. The optical module is also operable to convert electronic signals received from another component of the blade (e.g. processor 140) into optical signals and pass them to the optical receiver and from there through the window 40 and into the waveguide. The optical connector 120 may comprise a block of transparent material that is to be aligned with the window of the waveguide such that it can receive optical signals passing out of the window and direct them to the optical module, or can forward optical signals received from the optical module into the waveguide via the window 40.

While a single optical connector 120 is shown in FIG. 2, it would be possible to have several optical connectors—e.g. one for receiving optical signals from the waveguide and one for transmitting optical signals into the waveguide.

The optical backplane may be part of a chassis which provides mechanical support to receive the blade 100 in a position in which the optical connector 120 is aligned with the window 40 of the waveguide. In this position an external surface of the window 40 may abut with (contact with) or be close to an external surface of the optical connector 120 so that optical signals may be passed between the two. Alternatively there may be a 'mid-plane' or one or more intermediate optical components through which optical signals can pass between the waveguide window and the blade optical connector. The optical connector 120 and window 40 may in some cases be made of the same material or materials having similar optical properties. Generally the window 40 and optical connector may be transparent. They may for example be made of glass or plastic. In some cases there will be a small gap between the optical components (e.g. between window and optical connector or mid-plane), in which case the optical design specifies a certain allowable insertion loss.

To ensure that the optical signals pass smoothly between the window and the optical connector, a heating element 60 is provided to heat the optical window and/or optical connector so as to prevent or remove condensation. The heating element 60 is 'associated with' the window, meaning that the heating element is to heat the window and may for example be provided inside the window 40, inside the optical connector 120, or external to but in thermal contact with the window 40 or optical connector 120.

Figure 4:
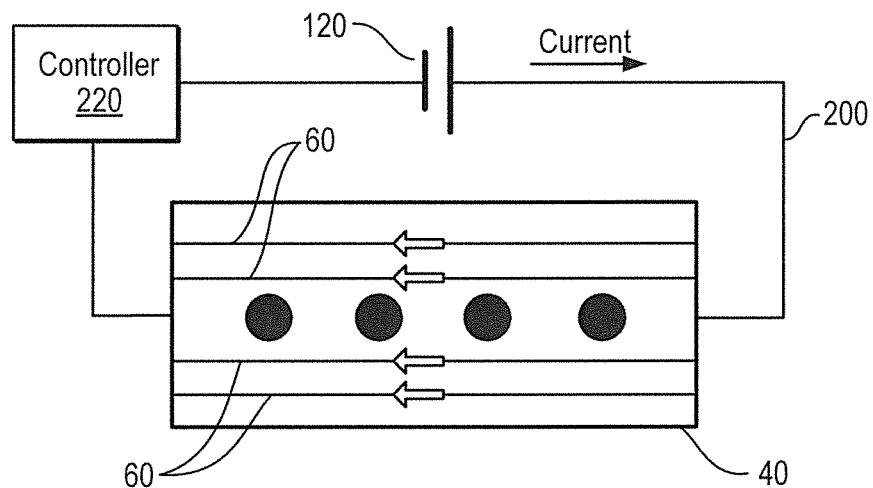
FIG. 4 shows a schematic example of a window and heating element for use in a waveguide.

FIG. 4 shows an example of the window 40 in more detail. The window may have a plurality of resistive elements 60 in the form of metal wires which act as heating elements to heat the window when current is passed through them. In the illustrated example there are four wires, but there may be any number. In the illustrated example the wires are arranged in rows and pass from one side of the window to the other along an axis generally parallel to the longitudinal axis 31 of the waveguide and generally parallel to the direction of optical signals leaving the waveguide. The heating elements 60 (e.g. wires) are positioned such that they do not interfere with optical signals passing through the window 40 (e.g. they may be nearer to the window edges, while the optical signals may pass through the center). Heating the wires by passing current causes heat to be dissipated and reach the external surfaces of the window thus causing condensation to evaporate or preventing its formation in the first place. In this way condensation may be minimized or prevented on an external surface of the window which acts as an interface for communicating optical signals with an optical connector of another device such as a blade.

The heating elements 60 may be connected to a circuit 200 which includes a voltage source 210 for passing current through the wires. The circuit 200 may include a controller 220 to control the level of current and/or voltage, e.g. to switch the circuit on when the ambient temperature is below a predetermined temperature at which condensation is a risk.

Figure 5:
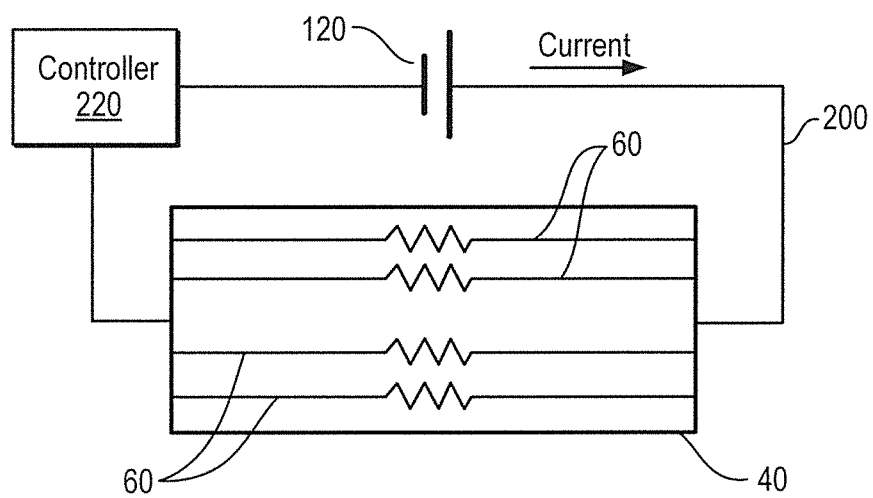
FIG. 5 is a circuit diagram showing the electrical configuration of the window and heating element of FIG. 4.

FIG. 5 is a circuit diagram of the arrangement of FIG. 4, illustrating the resistive nature of the wires in the window 40. Thus it can be seen that the wires extending through the window may have higher resistance than the electrical connection between the wires 60 and the voltage source 210.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An optical backplane comprising an optical waveguide to interface with a blade; the optical waveguide having a window to allow optical signals to enter or leave the optical waveguide; the window comprising a block of solid, transparent material to allow passage of optical signals and an external surface to interface with an optical receiver of the blade; the window further comprising a resistive element connectable to an electric circuit to heat the window when electric current is passed through the resistive element so as to prevent or remove condensation from said external surface of the window, wherein the backplane is capable of interfacing with a plurality of blades and wherein the optical waveguide has a plurality of windows each to interface with a respective blade.

2. The optical backplane of claim 1 wherein the window has a plurality of wires arranged in rows, each wire being a resistive element connectable to an electric circuit to heat the window to prevent or remove condensation from said external surface of the window.

3. The optical backplane of claim 1 comprising a controller to pass electric current through the resistive element to heat the window to prevent or remove condensation when the ambient temperature is below a predetermined threshold.

* * * * *